United States Patent [19]

Kazmerski

[11] Patent Number: 5,444,260

[45] Date of Patent: Aug. 22, 1995

[54] ATOMIC-LEVEL IMAGING, PROCESSING AND CHARACTERIZATION OF SEMICONDUCTOR SURFACES

[75] Inventor: Lawrence L. Kazmerski, Lakewood, Colo.

[73] Assignee: Midwest Reasearch Institute, Kansas City, Mo.

[21] Appl. No.: 87,630

[22] Filed: Jul. 1, 1993

[51] Int. Cl.⁶ .................................... H01J 37/30
[52] U.S. Cl. .................. 250/492.3; 250/306; 250/207
[58] Field of Search .............. 250/492.3, 306, 307, 250/492.2; 369/101, 126

[56] References Cited

U.S. PATENT DOCUMENTS

| | | | |
|---|---|---|---|
| 4,292,093 | 9/1981 | Ownby et al. | 148/4 |
| 4,327,477 | 5/1982 | Yaron et al. | 29/576 B |
| 4,343,993 | 8/1982 | Binnig et al. | 250/306 |
| 4,680,616 | 7/1987 | Delahoy et al. | 357/59 |
| 4,774,195 | 9/1988 | Beneking | 437/16 |
| 4,874,711 | 10/1989 | Hughes et al. | 437/8 |
| 4,918,309 | 4/1990 | Beha et al. | 250/306 |
| 4,942,299 | 7/1990 | Kazmerski | 250/306 |
| 5,116,782 | 5/1992 | Yamaguchi et al. | 437/172 |
| 5,144,148 | 9/1992 | Eigler | 250/492.3 |

Primary Examiner—Paul M. Dzierzynski
Assistant Examiner—Kiet T. Nguyen
Attorney, Agent, or Firm—Ken Richardson

[57] ABSTRACT

A method for selecting and removing single specific atoms from a solid material surface uses photon biasing to break down bonds that hold the selected atom in the lattice and to reduce barrier effects that hold the atom from transferring to a probe. The photon bias is preferably light or other electromagnetic radiation with a wavelength and frequency that approximately matches the wave function of the target atom species to be removed to induce high energy, selective thermionic-like vibration. An electric field potential is then applied between the probe and the surface of the solid material to pull the atom out of the lattice and to transfer the atom to the probe. Different extrinsic atoms can be installed in the lattice sites that are vacated by the removed atoms by using a photon bias that resonates the extrinsic atom species, reversing polarity of the electric field, and blowing gas comprising the extrinsic atoms through a hollow catheter probe.

8 Claims, 7 Drawing Sheets

ATOMIC-LEVEL IMAGING, PROCESSING AND CHARACTERIZATION OF SEMICONDUCTOR SURFACES

CONTRACTUAL ORIGIN OF THE INVENTION

The United States Government has rights in this invention under Contract No. DEAC0289CH10093 between the U.S. Department of Energy and the National Renewable Energy Laboratory, a Division of Midwest Research Institute.

BACKGROUND OF THE INVENTION

1. Field of the Invention

This invention is generally related to microscopic analysis and processing of structures and components of solid materials and more specifically to a method and apparatus for manipulating chemistry of crystalline structures by removing single intrinsic atoms and replacing with single intrinsic (same species) extrinsic (of different species) atoms.

2. Description of the Prior Art

There has long been a strong desire, and more recently specific needs, to be able to not only see, but also to manipulate, chemical compositions of crystalline structures on a single atom basis. For example, the control of electrical properties of defects in semiconductors is important for the improvement of both materials and characteristics of device performance. However, analyzing and understanding defect chemistry relating to doping and grain boundary passivation and alteration has been for the most part limited to bulk processing techniques, such as heat treatments and/or photoluminescence and deep-level transient spectroscopy. These bulk processing techniques have also been combined with Surface analysis techniques, such as auger electron spectroscopy and secondary ion mass spectrometry (SIMS). However, such bulk processing techniques, while useful, still leave considerable doubt as to whether the effects of defects on electrical properties of devices are thoroughly understood and whether selected passivation techniques provide optimum solutions.

Engineering of crystalline materials on an atom by atom basis can provide a method by which specific atoms at specific sites in defects of a crystalline structure can be replaced by selected different atomic species and then tested for electrical effects of such changes. When such electrical effects are understood, improved crystalline materials can be engineered and constructed on the basic atomic level or whole new materials can be engineered and constructed.

Manipulation of crystalline structures at the atomic level can also provide a basis for engineering and fabrication of the smallest resolution devices in which switching and other electrical functions occur at the atomic level. However, such manipulation of single specific atoms, i.e., replacing one selected atom with another at specific sites in a crystal lattice, could not be done prior to this invention.

SUMMARY OF THE INVENTION

Accordingly, it is a general object of this invention to provide a technique for manipulating crystalline structures on an atomic level.

Another general object of this invention is to provide a method and apparatus for changing the electrical properties of a semiconductor surface region by single atom manipulation with a high degree of precision, selectivity, and control.

A more specific object of this invention is to provide a method and apparatus for removal of single atoms from specific sites in crystalline or other semiconductor surfaces.

Another specific object of this invention is to provide a method and apparatus for placement of single extrinsic or intrinsic atoms at specific selected sites.

Still another object of this invention is to provide a method and apparatus for nano electrical characterization for evaluating and comparing minority carrier characteristics in the vicinity of defects before and after replacing defect atoms with other selected atom species.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described herein, the method of this invention may comprise the steps of positioning a fine-pointed electrode probe adjacent an atom that is selected to be removed from the surface of sample of material and then applying a photon bias to weaken the bond that hold it in the lattice and lower the barrier potentials between the probe and the sample surface. While the photon bias is being applied, an electric field potential is also applied between the probe and the sample surface to pull the selected atom out of the lattice to the probe. Because the photon bias weakens the bonds almost to zero, the electric field required to move the atom out of the lattice to the probe does not have to be very strong. The photon bias is preferably electromagnetic radiation, usually light, with a wavelength and frequency that substantially matches the wave function of the atom to be removed, thereby causing the atom to vibrate in resonance. The resonant vibration is very energetic and breaks down the bonds similar to thermionic emission, but on an atomic species specific basis. Temperature bias can also be applied to decrease atomic vibration of other atoms during the process. The atom can be re-installed back into a vacant site of the lattice under essentially the same conditions, except the polarity of the electric field is reversed to repel the atom from the probe and cause it to go back into the lattice. Other, extrinsic or intrinsic atoms can also be installed in essentially the same conditions, except the photon bias should have a frequency that matches the wave function of the atom to be inserted. The atom can be in a gas and blow, preferably in a short puff, through a hollow catheter probe positioned at the vacant site to enhance the likelihood of the desired atom species being inserted into the desired site, while minimizing likelihood of other atoms of that species also being captured by the lattice.

BRIEF DESCRIPTION OF THE DRAWINGS

The file of this patent contains at least one drawing executed in color. Copies of this patent with color drawings will be provided by the Patent and Trademark Office upon request and payment of the necessary fee.

The accompanying drawings, which are incorporated in and form a part of the specifications, illustrate the preferred embodiments of the present invention, and together with the descriptions serve to explain the principles of the invention.

In the Drawings.

DETAILED DESCRIPTION OF THE PREFERRED EMBODIMENTS

The spectroscopic Scanning Tunneling Microscope (STM) system 10 in FIG. 1 according to this invention is used to identify and remove a specific single atom from a material, such as a crystalline semiconductor surface, as will be described in more detail below. It can also be used according to this invention to insert or install a specific single atom in the place or position from where an atom has been removed.

The system 10 for purposes of this invention can be an adaptation of the spectroscopic STM system described in my U.S. Pat. No. 4,942,299, entitled Method and Apparatus for Differential Spectroscopic Atomic-Imaging Using Scanning Tunneling Microscopy, issued on Jul. 17, 1990, which patent is incorporated herein by reference and made a part hereof. Essentially, the method and apparatus my invention in my U.S. Pat. No. 4,942,299 provided the ability to image and display individual atoms on a sample surface, but to also identify and distinguish specific atomic species of the atoms being displayed. Essentially, conventional STM systems, such as that described in U.S. Pat. No. 4,343,993, issued to G. Benning et at., have the capability of detecting varying distances on an atomic scale basis of the tip of a probe from the surface of an object, and of then mapping and generating a computer display of the surface in a manner that reveals individual atoms, albeit not necessarily the particular species of those atoms.

Figure 1:
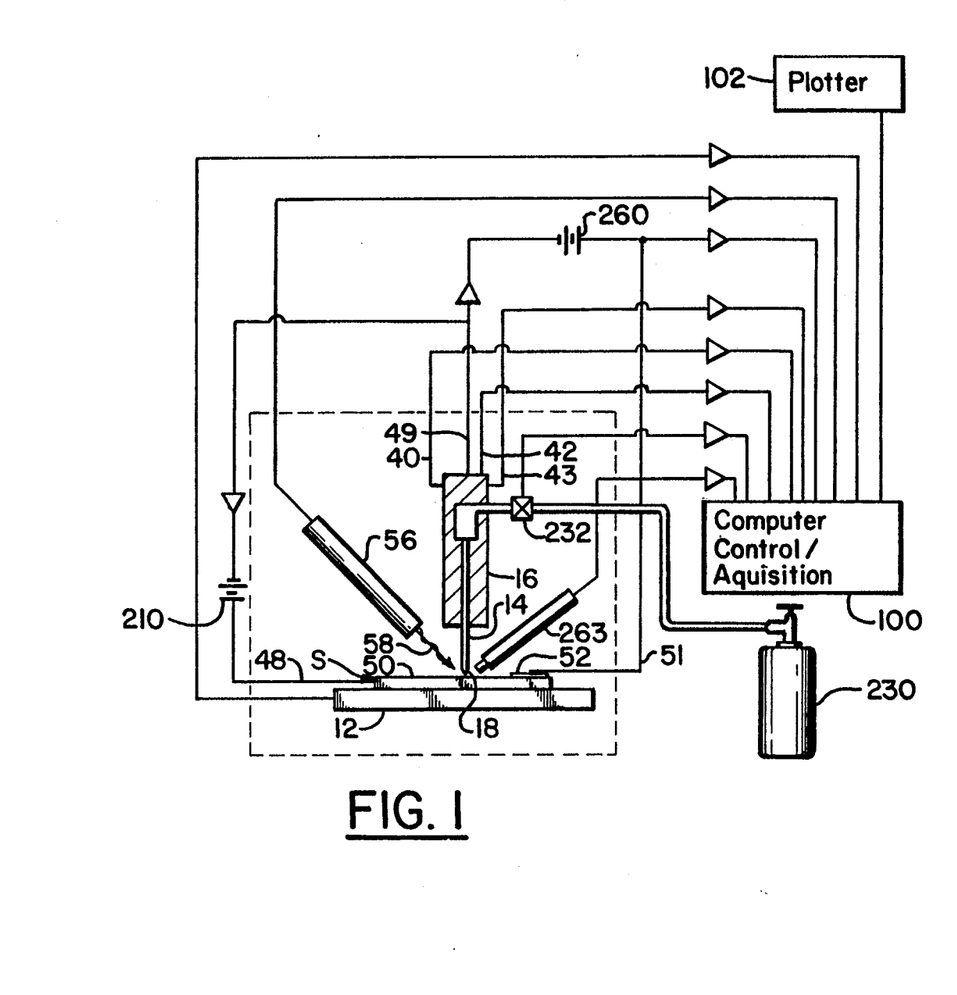
FIG. 1 is a schematic representation of the spectroscopic Scanning Tunneling Microscope (STM) and processing system as used by this invention.

Referring to FIG. 1, as well as to FIGS. 1 and 2 of my U.S. Pat. No. 4,942,299, in which comparable components are labeled with the same numbers for ease of cross-reference, an initial base bias voltage $V_B$ is applied to the sample S from which an atom is to be removed from its crystal lattice. The initial bias voltage may be, for example, about +9 volts applied by the base electrical bias source 210 via lead 48 in a conventional STM manner. An additional surface electronic bias from a source 260 is also set by application of an additional, separate electric potential $V_S$ between the tunneling electrode tip 18 of probe 14 and the sample surface 50 via lead 51 to an electrode contact 52 on the sample surface 50. The magnitude of the surface bias $V_S$ can be controlled by a computer 100.

Photon bias and resonance excitation of bonded atomic species in the surface 50 of sample S is provided preferably by a pulsed, tunable dye laser 56 covering a wavelength range of 240 to 1,100 nanometers. The wavelength specific light 58 can be directed onto the sample surface under probe 14 with optical fibers or any other suitable optical devices. The specific wavelength required, as will be described below can be controlled by the computer 100.

Temperature bias of the sample S can be provided by a refrigerator/heater base 12, which can also be controlled by the computer 100. Directional X-Y-Z motion of the probe 14 in relation to the sample S can be provided by computer 100 via leads 40, 42, 43 to piezoelectric transducers, which are not shown in FIG. 1, but which are shown and described in my U.S. Pat. No. 4,942,299 connected to the electrode mounting block 16.

In operation to remove an atom, the atom to be removed should be identified first. Locating and identifying the atom to be removed can be done essentially as described in my U.S. Pat. No. 4,942,299, preferably with the automated tip approach, wherein tunnel current feedback to the computer 100 is used to keep the tunnel current constant, thereby also keeping the tip 18 a constant distance from the surface S. The feedback voltage in lead 42 to the vertical or Z-axis control piezo driver required to keep the tunnel current constant is measured during a raster scan and presented on computer 100 terminal or on plotter 102 as a real-space image of the surface 50 to provide a topographic replica of the individual atoms in the scanned surface 50.

Concurrently with the topographical scanning, photon bias, voltage bias, and temperature bias are used in combination to determine specific species of the individual atoms mapped on the surface. Essentially, the sample S is cooled to near absolute zero to minimize unnecessary and potentially interfering atomic vibration. The surface bias voltage $V_S$ is then modulated over a preselected range, such as −11 to +1.5 volts, to find where increased density-of-states values indicate the presence of atoms in bonding. The photon biasing, especially when the wavelength or frequency of the light matches the wave function of an atom present in the bond at the tunneling location under probe 14, can cause the atom to resonate with the light and thereby dramatically increase the energy of the atomic wave function. The increase in wave function of the atom under the probe 14 causes a corresponding dramatic increase in tunnel current I, which results in a dramatic corresponding increase in the instantaneous change in tunnel current per instantaneous change in bias voltage $V_S$ which is referenced mathematically as $dI/dV_S$. The computer 100 constantly multiplies the $dI/dV_S$ factor times the value of $V_S/I$ to get the density-of-states value $(dI/dV_S)(V_S/I)$ for a given instantaneous bias voltage $V_S$. The density-of-states values $(dI/V_S)(V_S/I)$ plotted against the bias voltage $V_S$ forms the basis for identifying specific atomic species in the material or sample S, as described in more detail in my U.S. Pat. No.

4,942,299. When the contour map of the surface of the sample, showing spatial locations of individual atoms, is combined by computer 100 with identification of specific species or identities of those atoms, a contour map showing the actual atomic structure of the sample surface 50 can be obtained. The computer 100 can be programmed to assign different colors or different shades of gray to different species of atoms and then produce a final image on a high-resolution color printer 102 or any other suitable visual image device.

Figure 3:
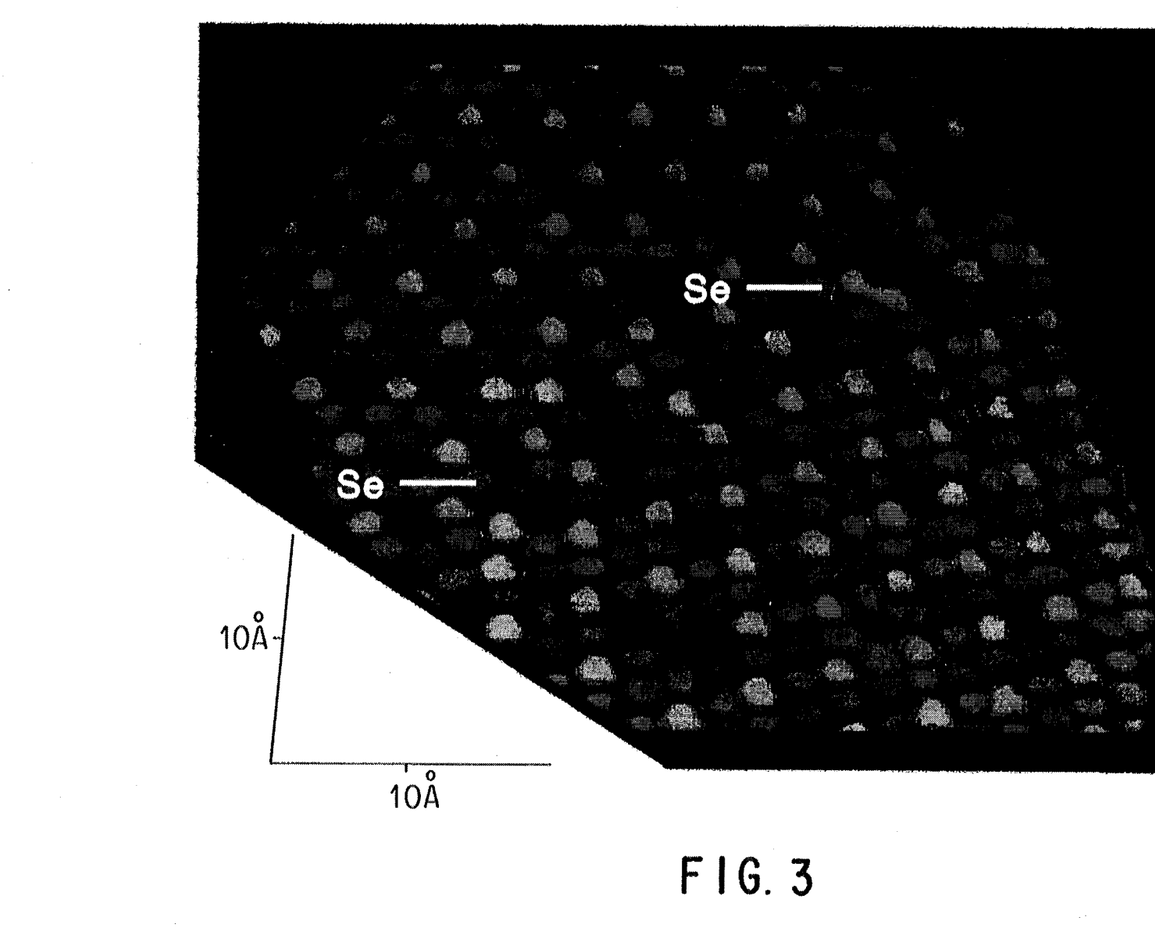
FIG. 3 is a topographic view in nanoscale of a CuIn-Se$_2$ sample surface from which selenium atoms are to be removed according to this invention.

For example, a topographic map of a copper indium diselenide ($CuInSe_2$) sample produced according to the invention of my U.S. Pat. No. 4,942,299 is shown in FIG. 3 with copper atoms in red, indium atoms in blue, and selenium atoms in magenta. This topographical map or image in FIG. 3 shows the positions of copper, indium, and selenium atoms in the vicinity of a $\Sigma 9$ type grain boundary intersecting the (220) surface of the $CuInSe_2$ which is the most common grain boundary geometry found in melt grown material. The bulk of the material was p-type, controlled by Cu vacancies and other intrinsic defects in the bulk of the semiconductor.

To remove a selected atom, the computer 100 is programmed to position the tip 18 of probe 14 directly over the atom selected to be removed which for purposes of this description is sometimes referred to as the target atom. With the sample S is preferably cooled to the desired temperature where atomic virbration is minimized, such as in the range of about $-265°$ to $50°$ C. (preferably about $5°$ to $20°$ C. for selenium), a photon bias is applied simultaneously with an electric pulse. Again, as in the imaging process described above, the photon bias for removal of an atom is preferably tuned to the wavelength or frequency that matches the wave function of the target atom to induce vibration of the atom in resonance with the light. The resonance vibration is high in energy and acts much like thermionic emission in that it reduces and almost eliminates chemical bonding forces that hold the vigorously vibrating atoms in the crystal lattice, thus reducing almost to zero the barrier potential between the probe 14 and the target atom. The power densities in the photon bias used to lower the effective barrier height is about five to ten times that required for imaging and it is typically on the order of 400 to 1,000 $mW/cm^2$. Since each atom species has a unique wave function, the tuned photon bias does not weaken significantly the bonds of other atom species in the vicinity of the target atoms selected for removal.

With the barrier potential of the target atom reduced almost to zero by the photon bias, application of a relatively small electric field potential between the sample surface 50 and the tip 18 of probe 14 can remove the target atom from the lattice. For example, where the excited target atom with its bond essentially eliminated is a positively charged ion, a small negative charge on the probe 14 will pull the target atom or ion easily out of the lattice to the tip 18 of the probe. The applied charge can be low enough to avoid ripping other atoms out of the lattice while still being very effective to remove the target atom under the tip 18. Of course, if the target atom separated from the lattice would be a negative ion, then a positive bias on the probe would be used to pull the atom out of the lattice.

Four sites of selenium atoms were selected and programmed for removal. Two of those preselected Se atom removal sites are marked on the image in FIG. 3 as Se. The other two of the four preselected sites are above the view region of the print in FIG. 3, but one of them is shown in the subsequent FIGS. 4 and 5. For the removal of a Se atom from the $CuInSe_2$ sample shown in FIG. 3 a photon bias with a wavelength of 1,138 nm and an electric field of 1.1 volt was found to be very effective. A field of 1.9 volts was found to be effective for removing single copper atoms from a $CuInSe_2$ lattice.

To re-install the target atom back into the lattice, the polarity can simply be reversed to place a positive charge on the probe 14 and thereby repel the target atom or ion back into the lattice. Of course, when the target atom is on the probe 14, it can also be moved and then inserted in a different location in the lattice, if desired.

Figure 4:
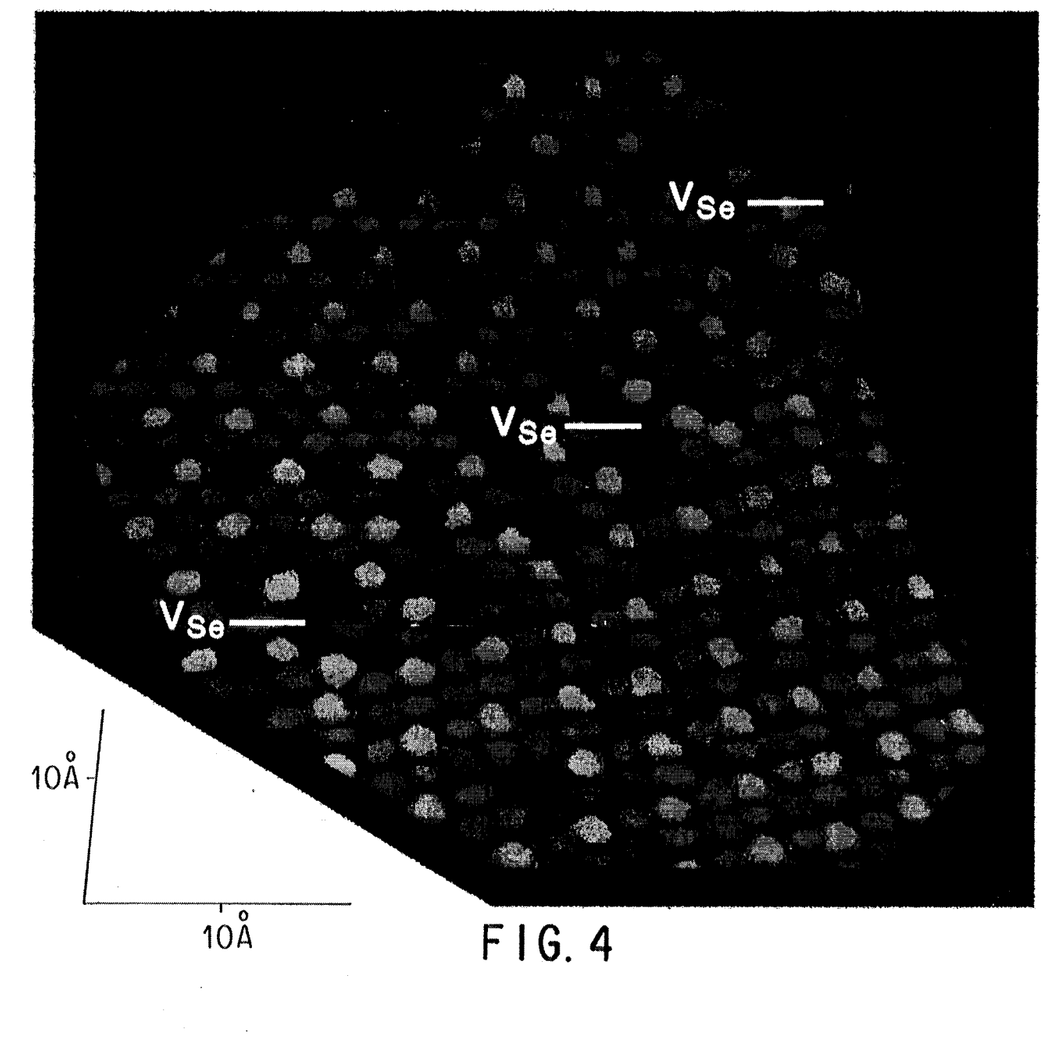
FIG. 4 is a topographic view of the same sample after removal of selenium atoms.

Both the photon bias and the electric field are preferably tuned as described above and applied in substantially simultaneous pulses. The pulse of photon bias is preferably slightly longer than the electrical field pulse in order to get the atom excited or in resonance before applying the electrical field pulse to extract the target atom from the lattice. The pulses have to be long enough to extract the target atom, but they should also be minimized to avoid removing clusters of atoms. For removing the selenium atoms in FIG. 3 from the $CuInSe_2$ lattice, pulses in the range of about 10 to 15 ms were appropriate and effective. The image in FIG. 4 shows the $CuInSe_2$ surface with the three selected selenium atoms removed according to this invention.

Another important feature of this invention is the ability to install an extrinsic or different atom species in a crystal lattice to replace an atom that is removed. To do so, the probe tip 18 is positioned over the location on site where the new atom is to be installed. The photon bias is preferably tuned to the wavelength or frequency that matches the wave function of the atom species that is being installed, and the electric field between the sample surface 50 and the probe 14 is the reverse polarity of what would be used to extract that atom from the lattice.

Figure 2:
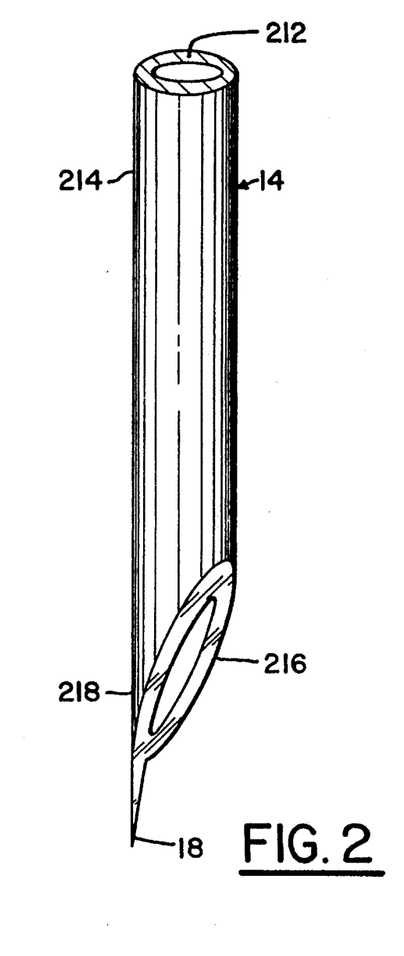
FIG. 2 is an enlarged perspective view of the catheter probe used in this invention.

In the preferred embodiment of this invention, the probe 14 used for installation of an atom is in the form of a hollow cathode, as shown in FIG. 2, so that a short puff of gas comprising the atom species to be installed can be directed precisely to the desired location or vacant site under the probe tip 18. The probe 14, as seen in FIG. 2, has an elongated, hollow tube shank 214 enclosing a longitudinal duct 212, and it terminates at its distal end 218 in a beveled cutoff 216 and sharply pointed tip 18. The probe 14 is positioned, as described above, directly over the location on the sample surface 50 where the extrinsic atom is to be installed. The gas comprising the extrinsic atom species is preferably provided from a tank 230 or other supply source, as shown in FIG. 1, delivered through duct 212 in catheter probe 14 in the form of a single short pulse or puff to confine the number and position of the extrinsic atoms delivered. The duration of the puff can be controlled by the computer 100 and solenoid valve 232. The photon bias, as mentioned above, should have a wavelength or frequency that substantially matches the wave function of the atom species that is being installed, and the electric field bias should be strong enough to be effective in transferring the atom from the probe 14 to the material, yet not be so strong as to cause the extrinsic atoms to be deposited or installed over larger areas.

For installing oxygen atoms in the $CuInSe_2$ sample S where the Se atoms were removed in the example described above, a single pulse of $-2.5$ to $-3.0$ volts for about 10 to 15 milliseconds provided the best control to place the oxygen atoms. Multiple negative and any positive pulses contaminated the tip 18 of the probe 14. A wavelength of 115, 131, 239, or 447 nm and a gas pulse of 50 to 150 ms duration resulted in the oxygen placement shown in yellow in FIG. 5. One additional oxygen atom is noted at the topmost part of the image in FIG. 5, which was deposited inadvertently during the procedure, and another oxygen atom was placed at the remaining processed Se vacancy site that is off the area of this image.

Figure 5:
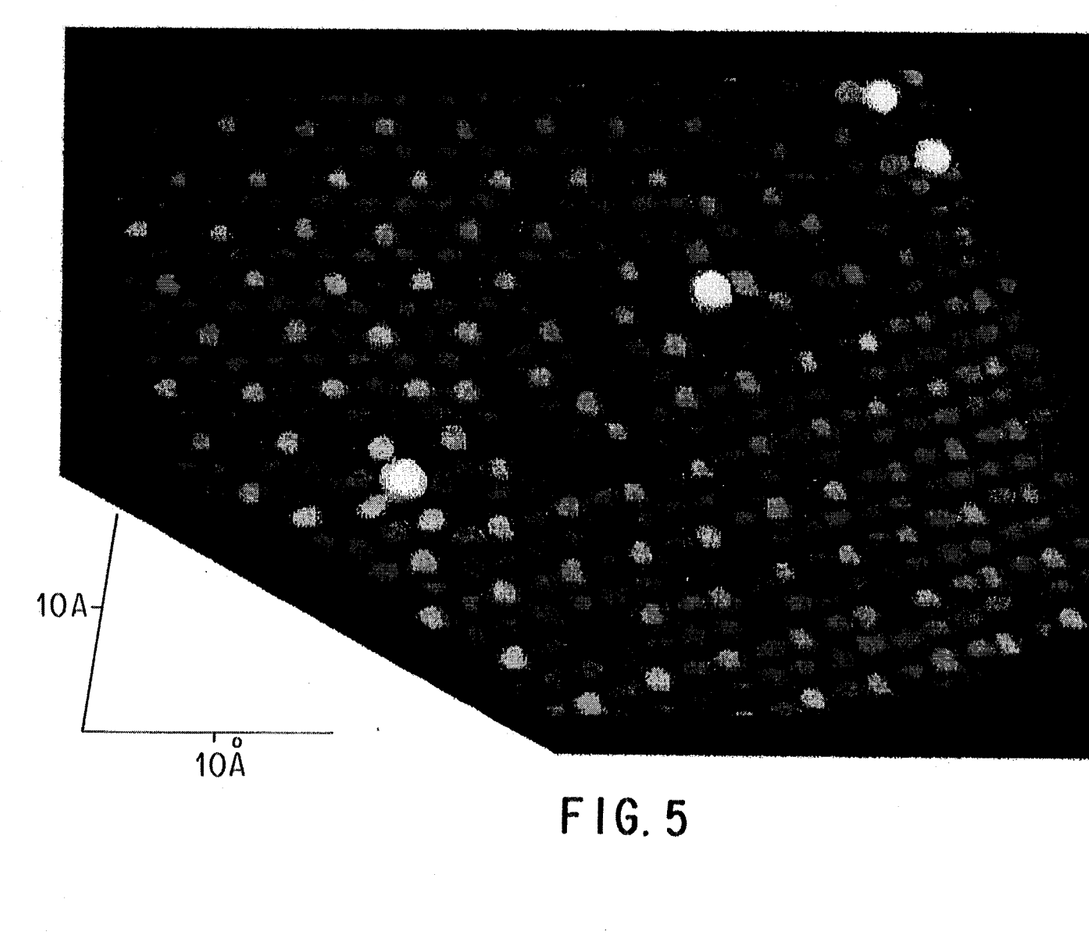
FIG. 5 is a topographic view of the same sample after installation of oxygen atoms at the vacant sites left by the removed selenium atoms.
Figure 6:
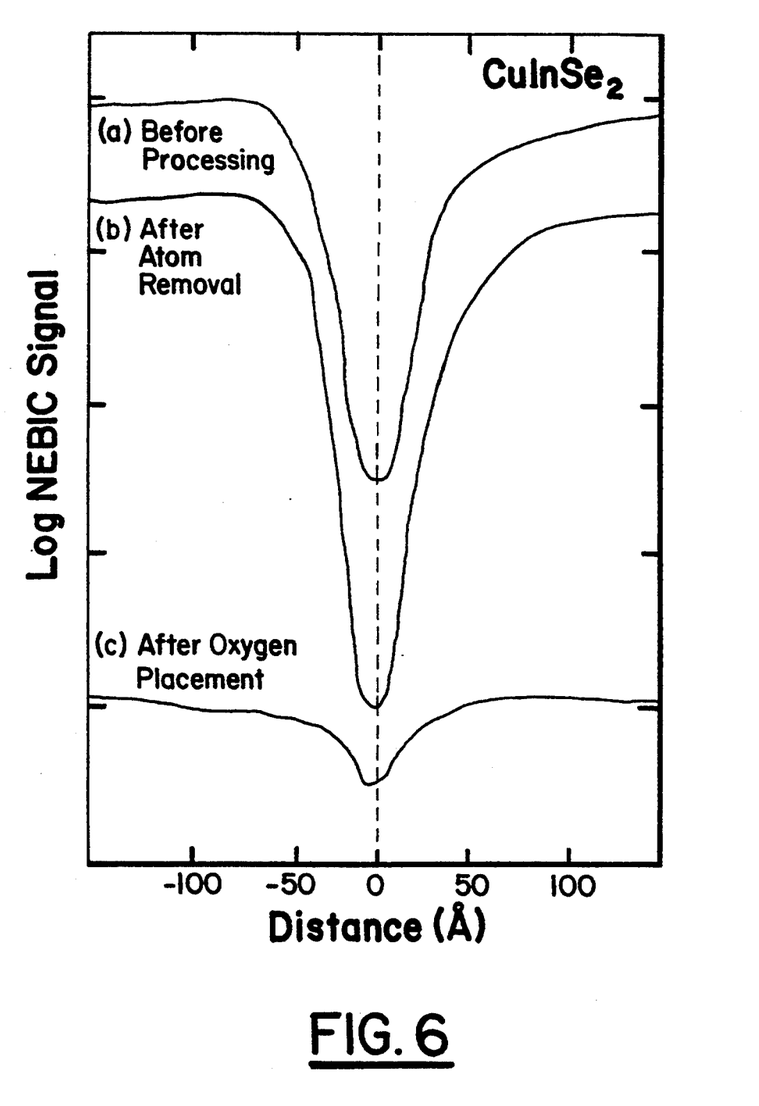
FIG. 6 is a graph of a nanoscale induced-current evaluation of the grain boundary of the sample of FIGS. 3–5 where the selenium removal and oxygen installation took place.

The sample $CuInSe_2$ grain boundary sample of FIG. 5 was evaluated for minority carrier properties by nanoscale electron beam induced current or conductivity (NEBIC) method under identical conditions V=9 volts, I=60 nA, and Z~30Å before selenium atom removal, again after selenium atom removal, and finally after the oxygen atom installation described above. The NEBIC testing procedure, which was the subject of my publication, L. L. Kazmersra, J. Vac. Sci. Technol., 89, 1549 (1991), does not form any part of this invention. However, it is a very effective method of evaluating the electrical effects of the sample described above in which the selenium atoms are exchanged with oxygen atoms according to the process of this invention. It has long been suspected that selenium vacancies were major defects that control the n- or p-type characteristics of the $CuInSe_2$ semiconductor material and that oxygen atoms act as acceptors. The results of the NEBIC tests on this sample confirm those suspicions. As shown in FIG. 6, removal of the selenium atoms from the preselected sites made the sample material more n-type and increased the electrical activity of the region, thereby confirming that selenium vacancies act as donors. The band bending increased the lateral dimension of the grain boundary, making it a more efficient sink for minority carriers. The test also confirms that oxygen electrically passivates this region and indicates that the oxygen atoms act as acceptors.

Additional information about the optical and electrical properties of semiconductor and other structures can be provided in nanophotoluminescence and cathodoluminescence techniques according to this invention. Photoluminescence, of course, is the inducement of light mission from a material by exciting the material with incident electromagnetic energy, which is indicative of various properties or characteristics of the material that can be beneficial or detrimental to its use in semiconductor devices. For example, a material may be more photoluminescent when excited by one or more particular wavelengths of incident light, and variations of such photoluminescent characteristics in response to processed changes in atomic structure of the material can provide important information about the effects of those changes in the material. Such information may relate, for example, to whether particular elements in defects act as donors or acceptors, whether they inhibit or enhance electrical activity, and the like. In a similar manner, some materials have luminescent characteristics that result from electrical excitation, which is often referred to as cathodoluminescenceo Those characteristics are also related to electrical activity in the material structure, and variations in the elemental atomic structure of the material can be manifested by variations in cathodoluminescence.

The method and apparatus of this invention can provide the ability to perform photoluminescence and cathodoluminescence tests on material on a nanoscale basis, which, when combined with the ability to focus it on individual, identifiable atoms, can yield useful information that was not available before. To do so, the apparatus of this invention, as shown in FIG. 1, can be equipped with a photodetector 263 positioned in close proximity to, and focused on, the sample surface 50 directly under the probe tip 18 for detecting any electromagnetic radiation luminescing from that area. The photodetector is preferably a very sensitive material, such as silicon (for evaluation of semiconductors with bandgaps above 1.1 eV) or germanium (for evaluation of semiconductors with bandgaps below 1.1 eV), and electrical signals indicative of the frequency and intensity of detected luminescence is monitored, processed, and recorded by the computer 100.

Figure 7:
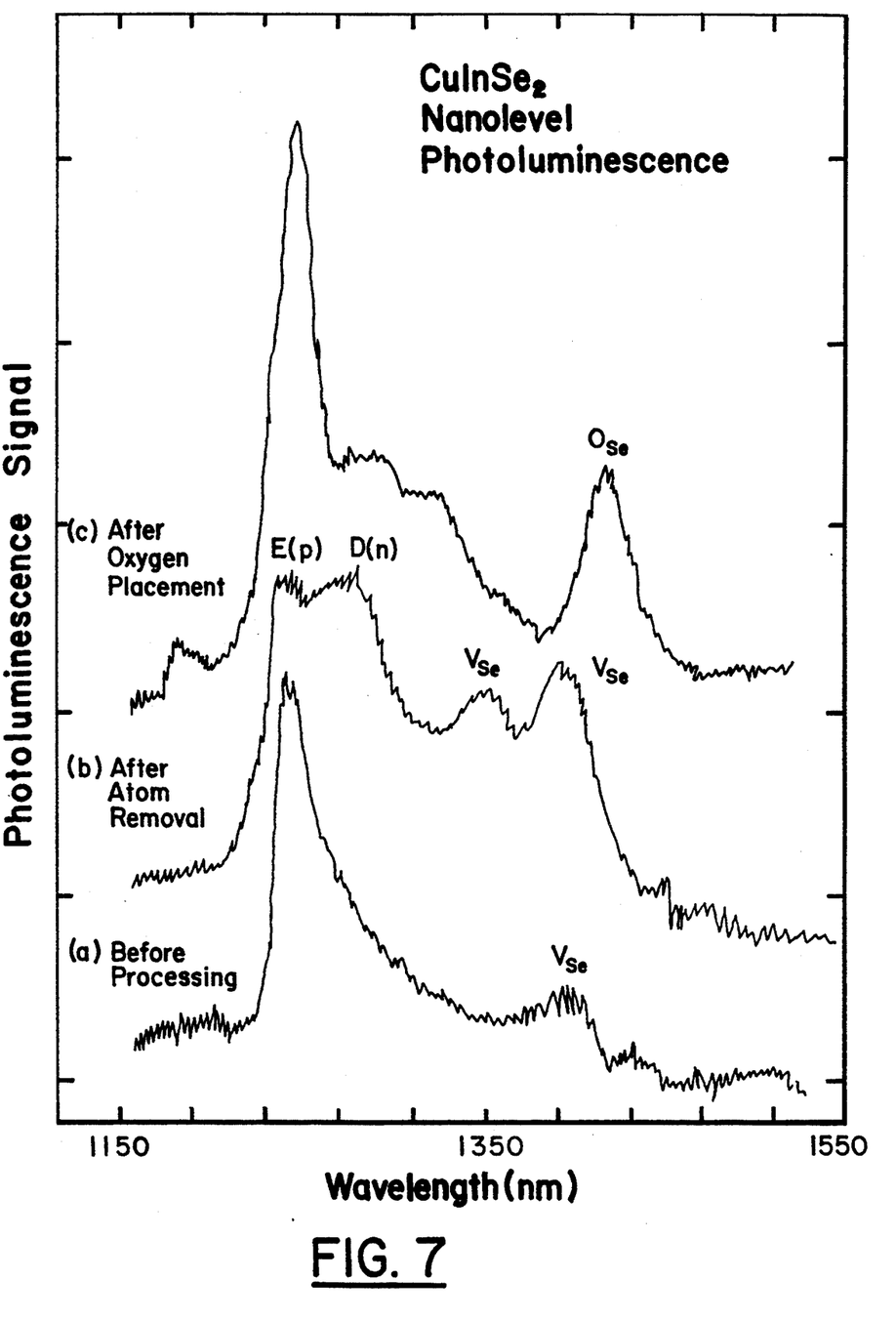
FIG. 7 is a graph of the nanolevel photoluminescence of the sample of FIGS. 3–5 before processing, after removal of the selenium atoms, and after placement of the oygen atoms.

When the light source 56 is tuned to a wavelength or frequency that matches the wave function of a particular atom species under the probe 14, the sample S material may luminesce at different frequencies, which can be detected by the photodetector 263 and recorded by the computer. The electric field from the probe tip 18 confines the optical excitation laser light 58 to very small impingement areas on the surface 50 under the probe 14, preferably in the order of only hundreds of angstroms or less. This confinement greatly enhances the spatial resolution of the light source, thus of the photoluminescent information obtained, to regimes significantly better than those predicated on its wavelength. The resulting photoluminescent signal, therefore, provides an evaluation of material defects and the like of that very small region. Such data can complement the NEBIC data and the removal replacement of specific atoms. For example, the graph in FIG. 7 presents photoluminescence test results on the $CuInSe_2$ sample described above before processing, after removal of the selenium atoms, and after placement of the oxygen atoms.

Figure 8:
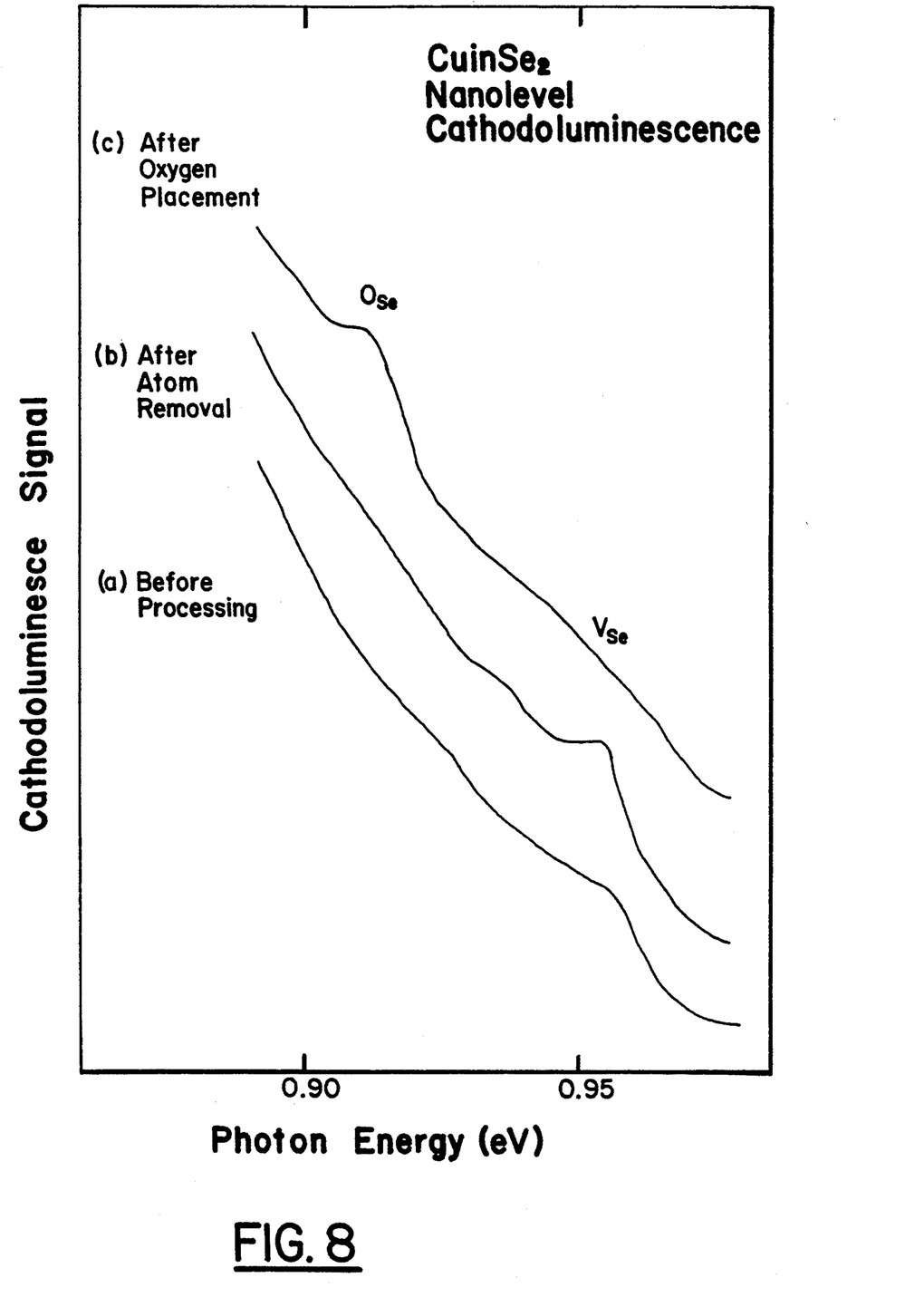
FIG. 8 is a graph of the nanolevel cathodoluminescence of the sample of FIGS. 3–5 before processing, after removal of the selenium atoms, and after placement of the oygen atoms.

Nanolevel cathodoluminescence testing can be performed in a similar manner according to this invention as the nanolevel photoluminescence testing described above. However, in the cathodoluminescence testing, no light from source 56 is used. Instead, the tunnel current I between the probe tip 18 and the sample surface 50 is essentially a very confined electron beam to areas much smaller than the order of hundreds of angstroms. This electron beam can excite atoms in that very small area to luminesce, which, as described above, can be detected by the photodetector 263 and fed to the computer 100. The graph in FIG. 8 shows the cathodoluminescence test results for the $CuInSe_2$ sample described above before processing, after removal of the selenium atoms, and after placement of the oxygen atoms. Again, this information complemented other data and provided useful information about the defects and the effects of the various atoms at particular sites.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The embodiments of the invention in which an exclusive property or privilege is claimed are defined as follows:

1. A nanoscale method for manipulating an atomic structure of a solid material comprising the steps of:

positioning a fine-pointed electrode probe adjacent an atom in a surface of a sample of the material in close enough proximity to said surface such that a wave function of said atom overlaps with wave functions of atoms in said probe;

applying a photon bias on a portion of said surface that includes said atom with said photon bias comprising electromagnetic radiation of a wavelength that matches the wave function of the atom to produce resonance vibration of the atom; and applying an electric field between said probe and said surface of a polarity that attracts said atom to the point of said probe.

2. The method of claim 1, further including the step of applying a temperature bias to the sample that stabilizes atomic vibration of said atom.

3. The method of claim 1, further including the step of re-installing said atom at a vacant site in the crystal lattice of a different location in the surface of said sample, including the steps of:

positioning said probe with said atom that is to be re-installed at said vacant site positioned on said point of said probe in sufficiently close proximity to said vacant site such that the wave function of the atoms in the probe would still overlap with said atom that is to be re-installed if said atom that is to be re-installed was positioned in said vacant site instead of on said point of said probe;

applying a photon bias for re-installation to said different location in the surface of said sample and to said atom on said point of said probe that is to be re-installed with said photon bias for insertion comprising electromagnetic radiation of a wavelength that matches the wave function of said atom that is to be re-inserted; and applying a sufficient reverse polarity electric field potential between said probe and said surface of said material to repel said atom that is to be re-installed away from said point of said probe and attract said atom that is to be reinstalled to said sample.

4. A method of installing an extrinsic atom in a surface of a solid material, comprising the steps of:

positioning a fine-pointed electrode probe adjacent a vacant atom site in said surface of said material and in sufficiently close proximity to said surface such that wave functions of atoms in said probe overlap with a wave function of the atom to be installed;

applying a photon bias to a portion of said surface of the material that includes said vacant site with the photon bias comprising electromagnetic radiation of a wavelength that matches the wave function of the atom to be installed;

applying a sufficient electric field potential between said probe and said surface of appropriate polarity to repel said atom away from said probe and toward said surface; and flowing a gas containing said extrinsic atom onto said surface adjacent said probe.

5. The method of claim 4, further including the step of applying a temperature bias to the sample that stabilizes atomic vibration of atoms in said surface.

6. The method of claim 4, wherein said gas flows through a duct in said probe and onto said surface containing said vacant site.

7. A method of testing electrical activity of a material, comprising the steps of:

positioning a probe in sufficiently close proximity to a surface of the material such that a wave function of an atom in said surface of the material overlaps with a wave function of an atom in the probe;

applying an electrical bias between the probe and the surface of the material to produce a tunnel current; and detecting light emitted in a luminescent manner from said surface of the material.

8. The method of claim 7, further including the step of irradiating the surface of the material under the probe with electromagnetic radiation of a wavelength that is similar to the wave function of said atom in said surface of the material under the probe.

* * * * *